(12) United States Patent
Gao et al.

(10) Patent No.: US 12,088,750 B2
(45) Date of Patent: Sep. 10, 2024

(54) DISPLAY SCREEN ASSEMBLY AND MOBILE TERMINAL

(71) Applicant: JRD COMMUNICATION (SHENZHEN) LTD., Guangdong (CN)

(72) Inventors: Youyi Gao, Guangdong (CN); Huajun Cheng, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 230 days.

(21) Appl. No.: 17/619,279

(22) PCT Filed: Dec. 13, 2019

(86) PCT No.: PCT/CN2019/125036
§ 371 (c)(1),
(2) Date: Dec. 15, 2021

(87) PCT Pub. No.: WO2021/082205
PCT Pub. Date: May 6, 2021

(65) Prior Publication Data
US 2022/0360656 A1     Nov. 10, 2022

(30) Foreign Application Priority Data
Oct. 29, 2019 (CN) .......................... 201911035220.7

(51) Int. Cl.
*H04M 1/02*     (2006.01)

(52) U.S. Cl.
CPC ...... *H04M 1/0266* (2013.01); *H04M 2250/22* (2013.01)

(58) Field of Classification Search
CPC .......... H04M 1/0266; H04M 2250/22; H04M 1/0268; H04M 1/0214; H04M 1/18
(Continued)

(56) References Cited

U.S. PATENT DOCUMENTS 9,635,767 B2    4/2017    Huang et al.
10,133,107 B2    11/2018    Hu
(Continued)

FOREIGN PATENT DOCUMENTS

CN     203313234 U     11/2013
CN     203590266 U     5/2014
(Continued)

OTHER PUBLICATIONS

International Search Report and the Written Opinion Dated Jul. 29, 2020 From the International Searching Authority Re. Application No. PCT/CN2019/125036 and its Translation of Search Report Into English (2 Pages).
(Continued)

*Primary Examiner* — Eugene Yun
(74) *Attorney, Agent, or Firm* — Rivka Friedman

(57) ABSTRACT

A display screen assembly and a mobile terminal are provided and include a display screen and a housing, the housing includes a bottom wall and side walls disposed around the bottom wall, the side walls disposed around the bottom wall are provided with positioning ribs configured to prevent the display screen from being in contact with the side walls, gaps are provided between the positioning ribs and the display screen, and a top of the positioning ribs is not higher than a top of the backlight plate.

16 Claims, 2 Drawing Sheets

(58) Field of Classification Search
USPC .......................................................... 455/575.1
See application file for complete search history.

(56) References Cited

U.S. PATENT DOCUMENTS

| | | | |
|---|---|---|---|
| 2010/0328854 A1 | 12/2010 | Nakao et al. | |
| 2011/0216489 A1 | 9/2011 | Lim et al. | |
| 2019/0171309 A1* | 6/2019 | Mims ...................... | G06F 3/041 |

FOREIGN PATENT DOCUMENTS

| | | |
|---|---|---|
| CN | 104238173 A | 12/2014 |
| CN | 104866139 A | 8/2015 |
| CN | 106547399 A | 3/2017 |
| CN | 108227269 A | 6/2018 |
| CN | 207521238 U | 6/2018 |

OTHER PUBLICATIONS

The Notice of Allowance and Search Report Dated Nov. 11, 2020, for JRD Communication (Shenzhen) Ltd., from China Application No. 201911035220.7 and its Translation of Notice of Allowance Into English (2 pages).

* cited by examiner

DISPLAY SCREEN ASSEMBLY AND MOBILE TERMINAL

CROSS REFERENCE TO RELATED APPLICATIONS

The present application is a US national phase application based upon an International Application No. PCT/CN2019/125036, filed on Dec. 13, 2019, which claims priority to China Patent Application having an application number of 201911035220.7, titled "DISPLAY SCREEN ASSEMBLY AND MOBILE TERMINAL", submitted to the China National Intellectual Property Administration on Oct. 29, 2019, which is incorporated by reference in the present application in its entirety.

BACKGROUND

Field of Invention

The present application relates to a display screen technology field, and more particularly to a display screen assembly and a mobile terminal.

In recent years, due to rapid development of terminals such as mobile phones, functions of the terminals have become more and more abundant, and the terminals have gradually become essential products for people.

In order to improve comfort of users when using the terminals, screen sizes of the terminals are becoming increasingly larger, and whole sizes of the terminals are also becoming larger as the screen sizes continue to increase. However, because when the whole sizes of the terminals exceed a certain size, they will not only affect usage effects but also affect visual effects that are felt by users, it is therefore necessary to reduce a thickness of a border disposed around a screen to make the whole sizes of the terminals be not too large. For this reason, narrow-border terminals have emerged.

Currently, a display screen adopted by a common narrow-border terminal is made up of a glass plate and a backlight plate that are stacked together and have a same size, a border size of the whole common narrow-border terminal is significantly smaller than that of a conventional display screen in which a backlight plate wraps a glass plate. However, due to lack of protection provided by the backlight plate for the glass plate in this design, an edge of the glass plate is prone to collide with a housing of the terminal during drop testing, which causes the screen to crack.

SUMMARY

The present application provides a display screen assembly and a mobile terminal, which are capable of reducing a risk of cracking of a display screen during drop testing and improving using reliability of the display screen.

The present application provides a display screen assembly comprising:

a display screen and a housing, the housing comprises a bottom wall and side walls disposed around the bottom wall, an accommodating recess is defined by the bottom wall and the side walls, the display screen is mounted in the accommodating recess, and the display screen comprises a glass plate and a backlight plate that are stacked together; the side walls disposed around the bottom wall are provided with positioning ribs configured to prevent the display screen from being in contact with the side walls, gaps are provided between the positioning ribs and the display screen, and a top of the positioning ribs is not higher than a top of the backlight plate; each of the positioning ribs comprises a vertical surface and an inclined surface, two sides of the inclined surface are connected with the vertical surface and the side wall, respectively, and a junction between the inclined surface and the vertical surface is provided with a rounded chamfer; a radius of the rounded chamfer ranges from 0.3 mm to 0.5 mm, an edge of the backlight plate is aligned with and attached to an edge of the glass plate, a distance between a lateral side of the backlight plate and the vertical surface ranges from 0.1 mm to 0.15 mm, and a distance between a lateral side of the glass plate and the side wall ranges from 0.3 mm to 0.4 mm.

In an embodiment, the edge of the backlight plate is aligned with and attached to the edge of the glass plate, the distance between the lateral sided of the backlight plate and the vertical surface is 0.1 mm, and the distance between the lateral side of the glass plate and the side wall is 0.3 mm.

In an embodiment, a distance between a top of the inclined surface and a top of the glass plate ranges from 0.25 mm to 0.4 mm, and a size of a matched vertical face of the positioning ribs and the backlight plate ranges from 0.3 mm to 0.4 mm.

In an embodiment, the distance between the top of the inclined surface and the top of the glass plate is 0.4 mm, and the size of the matched vertical face is 0.4 mm.

In an embodiment, each of the positioning ribs comprises a bar and/or bump located at a junction between the side wall and the bottom wall and extending along a direction away from the bottom wall.

In an embodiment, the display screen assembly further comprises a touch panel, the glass plate and the touch panel are bonded and fixed by foam adhesive, and the backlight plate is bonded and fixed with the bottom wall by conductive adhesive.

The present application provides a display screen assembly comprising:

a display screen and a housing, the housing comprises a bottom wall and side walls disposed around the bottom wall, an accommodating recess is defined by the bottom wall and the side walls, the display screen is mounted in the accommodating recess, and the display screen comprises a glass plate and a backlight plate that are stacked together; the side walls disposed around the bottom wall are provided with positioning ribs configured to prevent the display screen from being in contact with the side walls, gaps are provided between the positioning ribs and the display screen, and a top of the positioning ribs is not higher than a top of the backlight plate.

Wherein each of the positioning ribs comprises a vertical surface and an inclined surface, two sides of the inclined surface are connected with the vertical surface and the side wall, respectively, and a junction between the inclined surface and the vertical surface is provided with a rounded chamfer.

In an embodiment, a radius of the rounded chamfer ranges from 0.3 mm to 0.5 mm.

In an embodiment, an edge of the backlight plate is aligned with and attached to an edge of the glass plate, a distance between a lateral side of the backlight plate and the vertical surface ranges from 0.1 mm to 0.15 mm, and a distance between a lateral side of the glass plate and the side wall ranges from 0.3 mm to 0.4 mm.

In an embodiment, the edge of the backlight plate is aligned with and attached to the edge of the glass plate, the distance between the lateral side of the backlight plate and the vertical surface is 0.1 mm, and the distance between the lateral side of the glass plate and the side wall is 0.3 mm.

In an embodiment, a distance between a top of the inclined surface and a top of the glass plate ranges from 0.25 mm to 0.4 mm, and a size of a matched vertical face of the positioning ribs and the backlight plate ranges from 0.3 mm to 0.4 mm.

In an embodiment, the distance between the top of the inclined surface and the top of the glass plate is 0.4 mm, and the size of the matched vertical face is 0.4 mm.

In an embodiment, each of the positioning ribs comprises a bar and/or bump located at a junction between the side wall and the bottom wall and extending along a direction away from the bottom wall.

In an embodiment, the display screen assembly further comprises a touch panel, the glass plate and the touch panel are bonded and fixed by foam adhesive, and the backlight plate is bonded and fixed with the bottom wall by conductive adhesive.

The present application provides a mobile terminal comprising a terminal device, a back cover, and any display screen assembly described above, the display screen assembly is fixed to the back cover, and the terminal device is disposed between the display screen assembly and the back cover.

A beneficial effect of the present application is that the display screen assembly and the mobile terminal provided by the present application include the display screen and the housing. The housing includes a bottom wall and side walls disposed around the bottom wall. Compared with the prior art, the side walls disposed around the bottom wall are provided with positioning ribs configured to prevent the display screen from being in contact with the side walls, the gaps are provided between the positioning ribs and the display screen, and the top of the positioning ribs is not higher than the top of the backlight plate in the display screen. Therefore, during drop testing, a risk of collision between the glass plate and the housing can be reduced, cracking of the display screen is prevented, testing intensity for the display screen can be increased, and high reliability is achieved.

DESCRIPTION OF DRAWINGS

Specific implementations of the present application will be described below in conjunction with appending drawings. It will make technical solutions and other beneficial effects of the present application be obvious.

In order to clearly illustrate the technical solutions of embodiments of the present application, a brief description of the appending drawings used in the embodiments would be given as below. Obviously, the appending drawings in the following description are merely some embodiments of the present application. For persons skilled in this art, other drawings can be obtained from these drawings under the premise of no creative efforts made.

DETAILED DESCRIPTION OF EMBODIMENTS

Figure 1:
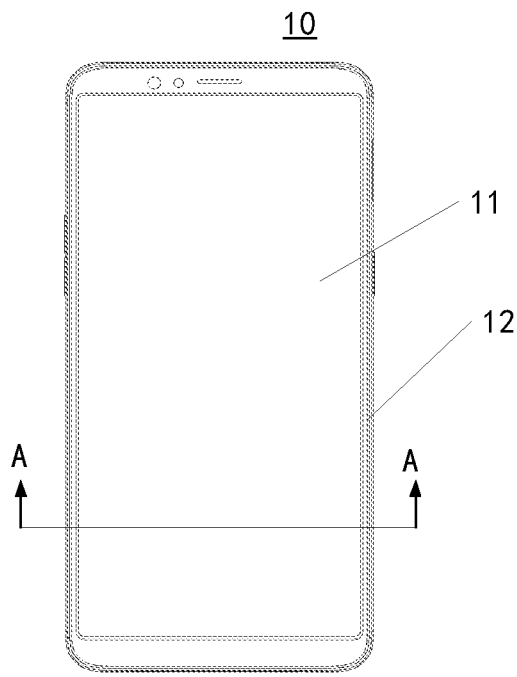
FIG. 1 is a schematic structural diagram showing a front view of a display screen assembly according to an embodiment of the present application.

The following descriptions for respective embodiments are specific embodiments capable of being implemented for illustrating the present application with referring to appending drawings. Spatially relative terms, such as "upper", "lower", "front", "back", "left", "right", "inner", "outer", and "lateral", mentioned in the present application are only directions with reference to the appending drawings. In the drawings, units with similar structures are indicated by same reference numbers. It should be noted that thicknesses and shapes shown in the appending drawings of the present application do not reflect true ratios of the thicknesses and the shapes, and a purpose of which is only to illustrate contents of the embodiments of the present application.

Currently, in conventional liquid crystal display (LCD) screens, a glass plate is usually wrapped by a backlight plate for protecting the glass plate. However, for a display assembly with this structure, because an edge of the backlight plate is away from an edge of the glass plate to a certain distance, it will cause a black border area (i.e., a non-display area) with a width about 0.6 mm to exist around a display area. For this reason, a narrow-border display screen is proposed, wherein a glass plate and a backlight plate in the narrow-border display screen have the same size, thereby preventing formation of the black border area. However, because the glass plate is not protected by the backlight plate and is exposed, the glass plate is prone to collide with a housing of a terminal having the glass plate during drop testing, which causes the screen to crack, so that a drop testing spec cannot be achieved. Therefore, there is an urgent need for a design of a display screen assembly capable of reducing a risk of cracking of a screen of the display screen assembly during drop testing.

Figure 2:
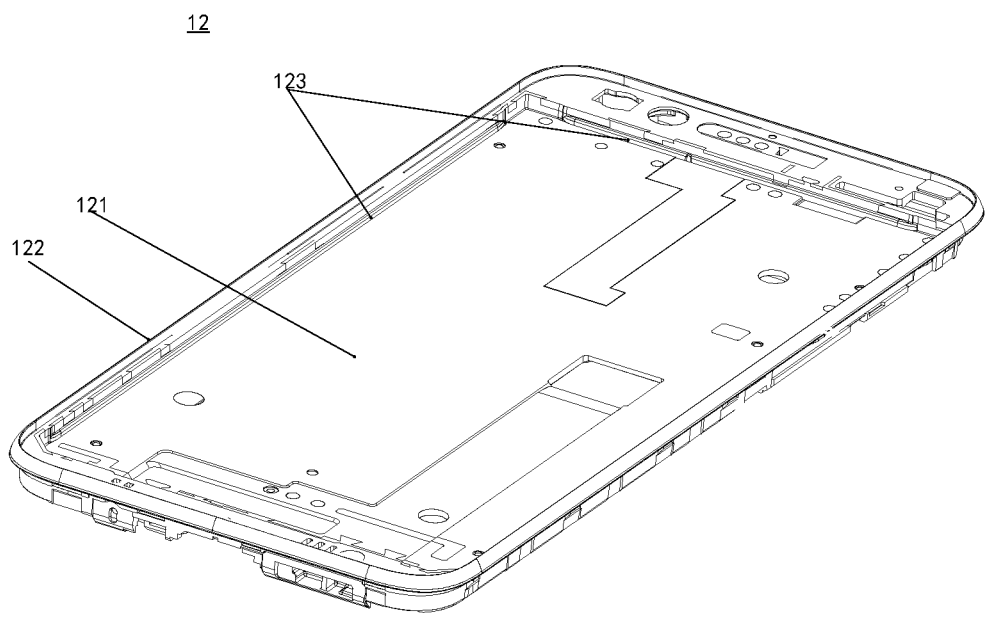
FIG. 2 is a schematic structural diagram showing a back view of the display screen assembly according to an embodiment of the present application.
Figure 3:
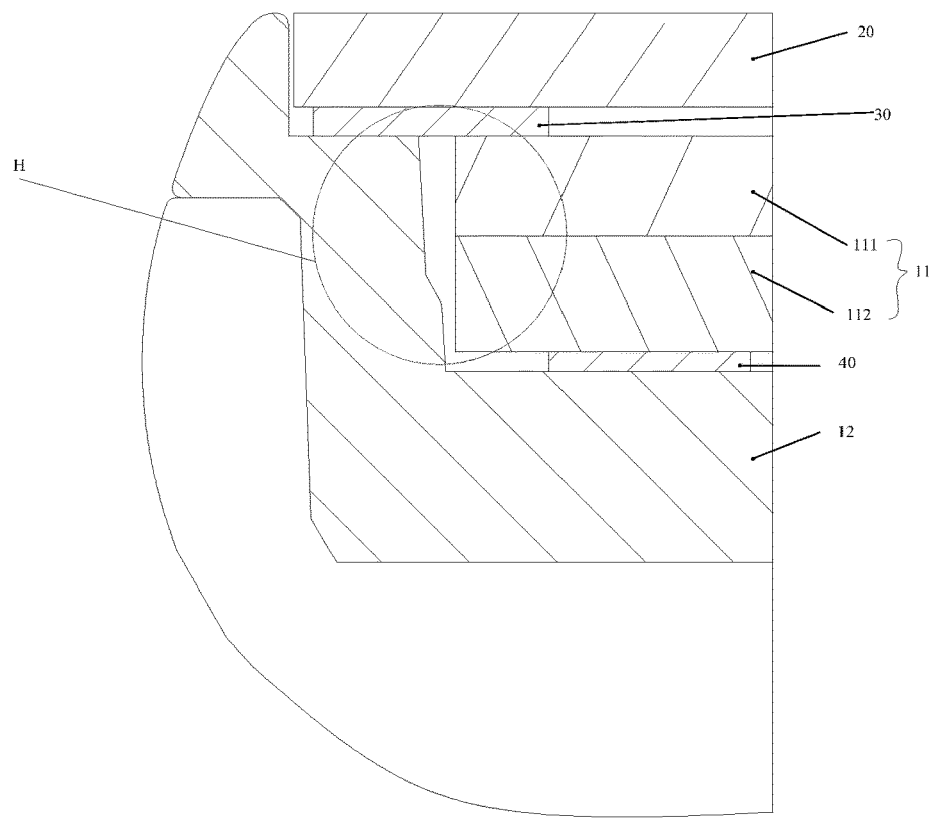
FIG. 3 is a schematic partial cross-sectional view along an A-A direction in FIG. 1.
Figure 4:
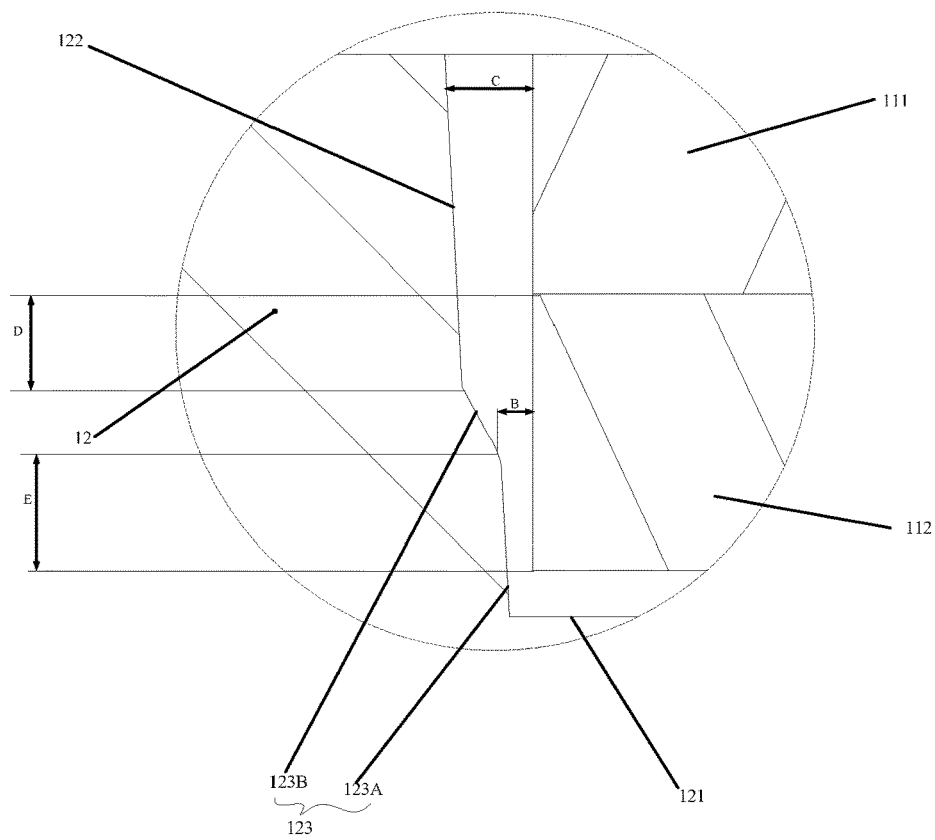
FIG. 4 is an enlarged schematic diagram of a dashed frame H in FIG. 3.

Referring to FIG. 1 to FIG. 4, FIG. 1 is a schematic structural diagram showing a front view of a display screen assembly according to an embodiment of the present application, FIG. 2 is a schematic structural diagram showing a back view of the display screen assembly according to an embodiment of the present application, FIG. 3 is a schematic partial cross-sectional view along an A-A direction in FIG. 1, and FIG. 4 is an enlarged schematic diagram of a dashed frame H in FIG. 3. It is possible to intuitively observe various components of the present invention and relative positional relationships between the respective components from the figures. As shown in FIG. 1 and FIG. 2, a display screen assembly 10 includes a display screen 11 and a housing 12, the housing 12 includes a bottom wall 121 and side walls 122 disposed around the bottom wall 121, an accommodating recess is defined by the bottom wall 121 and the side walls 122, the display screen 11 is mounted in the accommodating recess, and the display screen 11 includes a glass plate 111 and a backlight plate 112 that are stacked together. The side walls 122 disposed around the bottom wall 121 are provided with positioning ribs 123 configured to prevent the display screen 11 from being in contact with the side walls 122, gaps are provided between the positioning ribs 123 and the display screen 11, and a top of the positioning ribs 123 is not higher than a top of the backlight plate 112.

Specifically, since images shown on a liquid crystal display (LCD) are composed of dot light, line light, and surface light that are generated by stimulating liquid crystal molecules with electric current in cooperation with a backlight tube, the LCD has high display quality, good image effects, low power consumption, and no electromagnetic radiation. Hence, the display screen 11 is usually an LCD screen. A purpose of making the top of the positioning ribs 123 not higher than the top of the backlight plate 112 is to prevent the positioning ribs 123 from being in contact with the glass plate 111 during the drop testing and to reduce a risk of cracking of the glass plate 111 of the screen.

Wherein, each of the positioning ribs 123 may include a vertical surface 123A and an inclined surface 123B, two sides of the inclined surface 123B are directly connected with the vertical surface 123A and the side walls 122, respectively, and a junction between the inclined surface 123B and the vertical surface 123A is provided with a rounded chamfer (not shown). The top of the positioning ribs 123 is shaped as an inclined shape instead of a step shape, so that when the display screen 11 is assembled into the housing 12, a guiding function may be provided by the inclined surface 123B, which is conducive to mounting the display screen 11 in a center of the accommodating recess, and a situation that the display screen 11 is not disposed on point caused by steps of the positioning ribs 123 being pressed is prevented.

Compared with a right-angle chamfer, collision friction between the rounded chamfer and the display screen 11 can be reduced when the rounded chamfer collides with the display screen 11. A distance between a lateral side of the backlight plate 112 and the vertical surface 123A should not be too long or too short. If the distance is too long, thicknesses of the positioning ribs 123 will be reduced in a case that a gap between the display screen 11 and the side wall 122 is constant, and cracks generated by the housing 12 hitting the display screen 11 will be increased. If the distance is too short, installation of the display screen 11 will be affected by a tolerance problem.

In an embodiment, a radius of the rounded chamfer ranges from 0.3 mm to 0.5 mm. For example, the radius of the rounded chamfer is 0.3 mm. An edge of the backlight plate 112 is aligned with and attached to an edge of the glass plate 111, that is, the backlight plate 112 and the glass plate 111 have the same size to increase a screen-to-body ratio. A distance between a lateral side of the backlight plate 112 and the vertical surface 123A ranges from 0.1 mm to 0.15 mm, and a distance between a lateral side of the glass plate 111 and the side wall 122 ranges from 0.3 mm to 0.4 mm. For example, referring to FIG. 4, the distance B between the lateral side of the backlight plate 112 and the vertical surface 123A is 0.1 mm, and the distance C between the lateral side of the glass plate 111 and the side wall 122 is 0.3 mm. Thicknesses of the positioning ribs 123 are 0.2 mm.

Wherein, a top of the inclined surface 123B is lower than a top of the backlight plate 112, and a size of a matched vertical face of the positioning ribs 123 and the backlight plate 112 is smaller than a thickness of the backlight plate 112. A distance between the top of the inclined surface 123B and a top of the glass plate 111 ranges from 0.25 mm to 0.4 mm, and the size of the matched vertical face of the positioning ribs 123 and the backlight plate 112 ranges from 0.3 mm to 0.4 mm. For example, in an embodiment, referring to FIG. 4, the distance D between the top of the inclined surface 123B and the top of the glass plate 111 is 0.4 mm, and the size E of the matched vertical face is 0.4 mm.

It should be explained that by setting the distance D between the top of the inclined surface 123B and the top of the glass plate 111 to 0.4 mm, a sufficient safety distance can be reserved to prevent the glass plate 111 from colliding with the positioning ribs 123 when the display screen 11 swings horizontally. By setting the size E of the matched vertical face to 0.4 mm, the display screen 11 can be limited by the vertical surface 123A when the display screen 11 swings horizontally.

Wherein, the number and positions of the positioning ribs 123 can be set manually. Generally, in order to ensure that the glass plate 111 does not collide with the side walls 122, the number of the positioning ribs 123 is not less than 4, of which the positions may be lower positions of the side walls 122, such as positions of bottoms of the side walls 122 or positions close to the bottoms (such as positions of middles of the side walls 122).

In an embodiment, each of the positioning ribs 123 includes a bar and/or bump located at a junction of the side wall 122 and the bottom wall 121 and extending along a direction away from the bottom wall 121. There are a plurality of bars and/or bumps, and the plurality of convex bars and/or bumps are disposed at intervals on the same horizontal line.

For example, in FIG. 2, the positioning ribs 123 are the bars, of which the number is 4, and a length of each of the positioning ribs 123 must be less than a corresponding side length of the side walls 122. For example, the length of the positioning ribs 123 is 4/5 of the side length of the side walls 122. Of course, the positioning ribs 123 may also be the bumps, of which the number may be 12, three bumps fall into one group, the groups are located on the same plane, and the three bumps are disposed at intervals and spaced apart from each other.

In addition, in FIG. 3, the display screen assembly 10 further includes a touch panel 20, the glass plate 111 and the touch panel 20 are bonded and fixed by foam adhesive 30, and the backlight plate 112 is bonded and fixed with the bottom wall 121 by conductive adhesive 40.

During actual testing, when a mobile terminal is dropped, for example, dropped from a height of 1 meter or 1.5 meters, even if the display screen 11 swings due to instability in a horizontal direction and a vertical direction in terms of bonding and fixing in this fixing way, for example, a swing range exceeding 0.3 mm or even greater, since the side walls 122 of the housing 12 are provided with the positioning ribs 123, and the gaps are directly provided between the positioning ribs 123 and the display screen 11, the top of the positioning ribs 123 is not higher than the top of the backlight plate 112, so even if swinging occurs, the glass plate 111 will not directly collide with the housing 12, and the risk of cracking of the display screen 11 is reduced.

In addition, an embodiment of the present application further provides a mobile terminal (not shown), including a terminal device, a back cover, and any display screen assembly describe above, the display screen assembly is fixed to the back cover, and the terminal device is disposed between the display screen assembly and the back cover.

Compared with the prior art, the display screen assembly 10 and the mobile terminal provided by the present application include the display screen 11 and the housing 12. The housing 12 includes the bottom wall 121 and the side walls 122 disposed around the bottom wall 121. The side walls 122 disposed around the bottom wall 121 are provided with the positioning ribs 123 configured to prevent the display screen 11 from being in contact with the side walls 122, the gaps are provided between the positioning ribs 123 and the display screen 11, and the top of the positioning ribs 123 is not higher than the top of the backlight plate 112 in the display screen 11. Therefore, during drop testing, the risk of collision between the glass plate 111 and the housing 12 can be reduced, cracking of the display screen 11 is prevented, testing intensity for the display screen 11 can be increased, and high reliability is achieved.

In addition to the foregoing implementations, the present application may further have other implementations. All technical solutions formed by equivalent replacements fall within the protection scope claimed by the present application.

Above all, although the present application has been disclosed above in the preferred embodiments, the above preferred embodiments are not intended to limit the present application. For persons skilled in this art, various modifications and alterations can be made without departing from the spirit and scope of the present application. The protective scope of the present application is subject to the scope as defined in the claims.

What is claimed is:

1. A display screen assembly, comprising:
a display screen comprising a glass plate and a backlight plate that are stacked together; and
a housing comprising a bottom wall and side walls disposed around the bottom wall, wherein the side walls disposed around the bottom wall are provided with positioning ribs configured to prevent the display screen from being in contact with the side walls, and gaps are provided between the positioning ribs and the display screen;
wherein an accommodating recess is defined by the bottom wall and the side walls, the display screen is mounted in the accommodating recess, and a top of the positioning ribs is not higher than a top of the backlight plate;
wherein each of the positioning ribs comprises a vertical surface and an inclined surface, two sides of the inclined surface are directly connected with the vertical surface and the side wall, respectively, and a junction between the inclined surface and the vertical surface is provided with a rounded chamfer;
wherein a radius of the rounded chamfer ranges from 0.3 mm to 0.5 mm, an edge of the backlight plate is aligned with and attached to an edge of the glass plate, a distance between a lateral side of the backlight plate and the vertical surface ranges from 0.1 mm to 0.15 mm, and a distance between a lateral side of the glass plate and the side wall ranges from 0.3 mm to 0.4 mm.

2. The display screen assembly as claimed in claim 1, wherein the edge of the backlight plate is aligned with and attached to the edge of the glass plate, the distance between the lateral sided of the backlight plate and the vertical surface is 0.1 mm, and the distance between the lateral side of the glass plate and the side wall is 0.3 mm.

3. The display screen assembly as claimed in claim 1, wherein a distance between a top of the inclined surface and a top of the glass plate ranges from 0.25 mm to 0.4 mm, and a size of matched vertical face of the positioning ribs and the backlight plate ranges from 0.3 mm to 0.4 mm.

4. The display screen assembly as claimed in claim 3, wherein the distance between the top of the inclined surface and the top of the glass plate is 0.4 mm, and the size of the matched vertical face is 0.4 mm.

5. The display screen assembly as claimed in claim 1, wherein each of the positioning ribs comprises a bar and/or bump located at a junction between the side wall and the bottom wall and extending along a direction away from the bottom wall.

6. The display screen assembly as claimed in claim 1, wherein the display screen assembly further comprises a touch panel, the glass plate and the touch panel are bonded and fixed by foam adhesive, and the backlight plate is bonded and fixed with the bottom wall by conductive adhesive.

7. A display screen assembly, comprising:
a display screen comprising a glass plate and a backlight plate that are stacked together; and
a housing comprising a bottom wall and side walls disposed around the bottom wall, wherein the side walls disposed around the bottom wall are provided with positioning ribs configured to prevent the display screen from being in contact with the side walls, and gaps are provided between the positioning ribs and the display screen;
wherein an accommodating recess is defined by the bottom wall and the side walls, the display screen is mounted in the accommodating recess, and a top of the positioning ribs is not higher than a top of the backlight plate;
wherein each of the positioning ribs comprises a vertical surface and an inclined surface, and two sides of the inclined surface are directly connected with the vertical surface and the side wall, respectively; and
wherein a junction between the inclined surface and the vertical surface is provided with a rounded chamfer and a radius of the rounded chamfer ranges from 0.3 mm to 0.5 mm.

8. The display screen assembly as claimed in claim 7, wherein an edge of the backlight plate is aligned with and attached to an edge of the glass plate, a distance between a lateral side of the backlight plate and the vertical surface ranges from 0.1 mm to 0.15 mm, and a distance between a lateral side of the glass plate and the side wall ranges from 0.3 mm to 0.4 mm.

9. The display screen assembly as claimed in claim 8, wherein the edge of the backlight plate is aligned with and attached to the edge of the glass plate, the distance between the lateral side of the backlight plate and the vertical surface is 0.1 mm, and the distance between the lateral side of the glass plate and the side wall is 0.3 mm.

10. The display screen assembly as claimed in claim 7, wherein a distance between a top of the inclined surface and a top of the glass plate ranges from 0.25 mm to 0.4 mm, and a size of a matched vertical face of the positioning ribs and the backlight plate ranges from 0.3 mm to 0.4 mm.

11. The display screen assembly as claimed in claim 10, wherein the distance between the top of the inclined surface and the top of the glass plate is 0.4 mm, and the size of the matched vertical face is 0.4 mm.

12. The display screen assembly as claimed in claim 7, wherein each of the positioning ribs comprises a bar and/or bump located at a junction between the side wall and the bottom wall and extending along a direction away from the bottom wall.

13. The display screen assembly as claimed in claim 7, wherein the display screen assembly further comprises a touch panel, the glass plate and the touch panel are bonded and fixed by foam adhesive, and the backlight plate is bonded and fixed with the bottom wall by conductive adhesive.

14. A mobile terminal, comprising:
a back cover;
a display screen assembly fixed to the back cover and comprising a display screen and a housing; and
a terminal device disposed between the display screen assembly and the back cover;
wherein the housing comprises a bottom wall and side walls disposed around the bottom wall, an accommodating recess is defined by the bottom wall and the side walls, the display screen is mounted in the accommodating recess, and the display screen comprises a glass plate and a backlight plate that are stacked together;

wherein the side walls disposed around the bottom wall are provided with positioning ribs configured to prevent the display screen from being in contact with the side wall, gaps are provided between the positioning ribs and the display screen, and a top of the positioning ribs is not higher than a top of the backlight plate;

wherein each of the positioning ribs comprises a vertical surface and an inclined surface, and two sides of the inclined surface are directly connected with the vertical surface and the side wall, respectively; and wherein a junction between the inclined surface and the vertical surface is provided with a rounded chamfer and a radius of the rounded chamfer ranges from 0.3 mm to 0.5 mm.

15. The mobile terminal as claimed in claim 14, wherein an edge of the backlight plate is aligned with and attached to an edge of the glass plate, a distance between a lateral side of the backlight plate and the vertical surface ranges from 0.1 mm to 0.15 mm, and a distance between a lateral side of the glass plate and the side wall ranges from 0.3 mm to 0.4 mm.

16. The mobile terminal as claimed in claim 15, wherein the edge of the backlight plate is aligned with and attached to the edge of the glass plate, the distance between the lateral side of the backlight plate and the vertical surface is 0.1 mm, and the distance between the lateral side of the glass plate and the side wall is 0.3 mm.

* * * * *